United States Patent Office 3,215,428
Patented Nov. 2, 1965

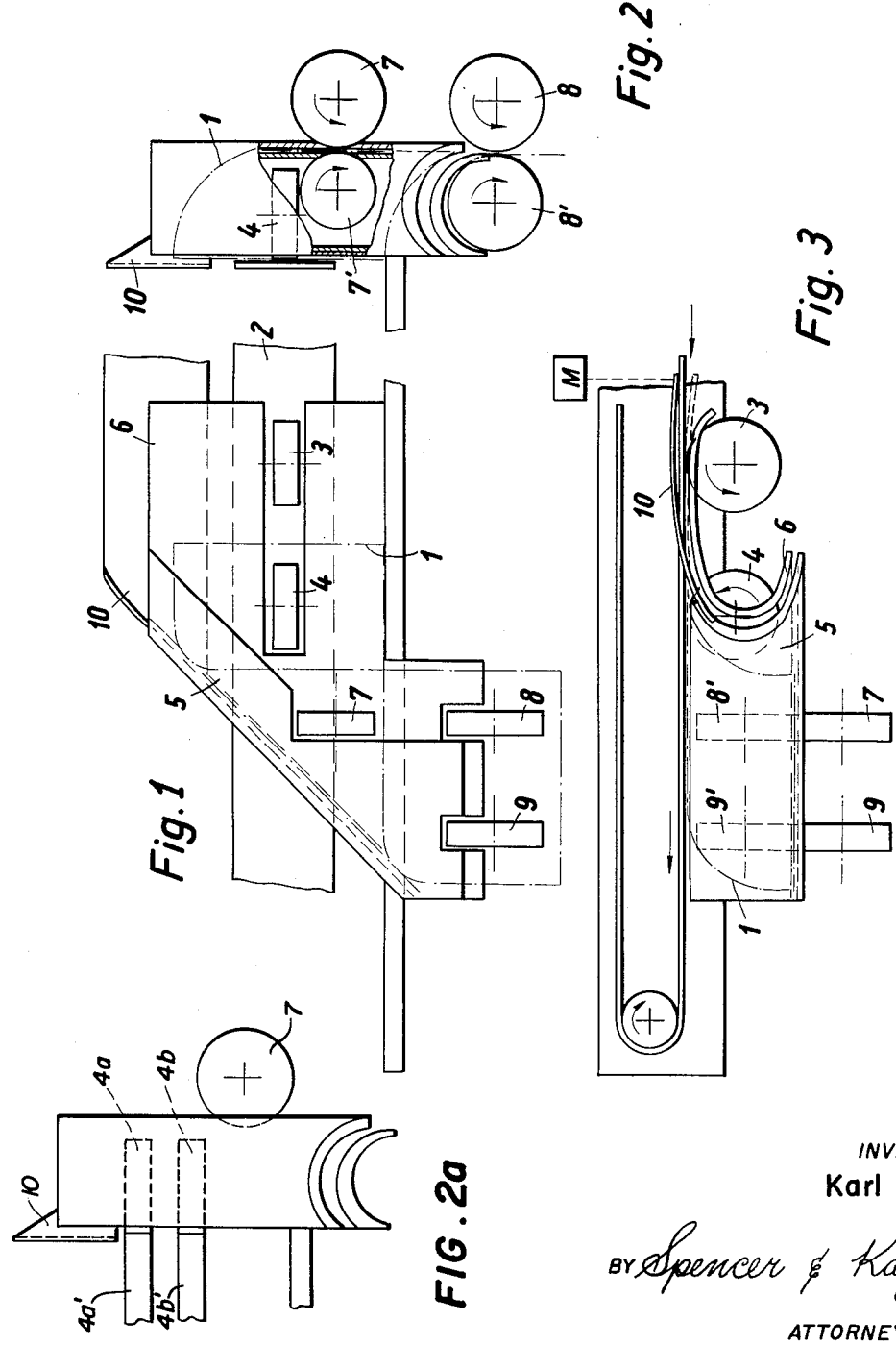

3,215,428
GUIDING DEVICE
Karl Rehm, Konstanz, Germany, assignor to Telefunken Patentverwertungs-G.m.b.H., Ulm (Danube), Germany
Filed July 10, 1963, Ser. No. 293,941
Claims priority, application Germany, July 11, 1962, T 22,442
7 Claims. (Cl. 271—71)

The present invention relates generally to the art of automatic processing of shipments, and the like, such as vouchers and money orders, and, more particularly, to a device for guiding and turning such flexible flat articles.

In the automatic processing of shipments they are generally conveyed on edge since this provides better possibilities for processing them. However, they are to be branched off or conveyed finally into sorting boxes and stacked in such sorting boxes in a manner whereby they lie flat on their surfaces rather than on edge. In order to provide this type of change in the conveying direction and in the conveying plane guiding and turning devices are needed. Such devices are also used in conveying arrangements for flexible articles other than the shipments and are used generally in those instances wherein the main conveying direction and/or the conveying plane of the goods to be transported is to be changed.

Guiding and turning devices of this type are already known. For example, for guiding purposes switches, foils, suction drums, other rolling arrangements, or guiding channels are used. Guiding channels are already known in which, during the guiding process, a turning movement of 90° is provided. The first-mentioned type of device besides being rather expensive has the particular disadvantage that it is not capable of guiding and turning at the same time. However, since many processing operations require guiding and turning, such devices require an additional turning arrangement which increases the structural length of the entire device by a not insubstantial amount. This is particularly disadvantageous when the articles are to be deposited into several containers disposed side-by-side. The above-mentioned guiding channels which provide 90° turning movement have the disadvantage that the vouchers must travel along a relatively long path during which no transporting operation is carried out. Because of this the structural length of the devices is very large and when long transport paths are used, there is a greater danger of damaging or clogging the vouchers, than when short paths are used. This type of damage can arise because short shipments, if they are not sufficiently guided, may easily start lifting or fluttering and thus become braked so that subsequent shipments can move to overlapping positions.

With these defects of the prior art in mind, it is a main object of the present invention to provide a guiding and turning arrangement which avoids all of the above-mentioned disadvantages of the piror art.

Another object of the invention is to provide a device for simultaneously guiding and turning shipments while positively feeding them during this operation.

A further object is to provide a device of the character described wherein the path of motion of the articles may be changed by 90° and their planes rotated 180°.

These objects and others ancillary thereto are accomplished according to preferred embodiments of the invention wherein a curved guide surface is provided as a guiding and turning element. This guide surface connects a feed conveying path with a discharge conveying path in a continuous transition so that the shipments cling to the inside of the shape of the guide surface because of their inherent rigidity or kinetic energy. They are thus guided and are turned by this surface with respect to their original conveying direction and conveying plane. The guide surface at that portion which effects the guidance is curved so that the generatrix is a straight line. Furthermore, conveying means are arranged in front of the guide surface and also behind it. This is provided in such a manner that the shipments are engaged by at least one of these conveying means during the entire guiding and turning process.

In a preferred embodiment of the invention, the guide surface is curved in a cylindrical manner, for example, in a circular cylindrical manner and the axis and/or axes of its curvature is disposed at an angle of approximately 45° with the conveying direction.

As a further feature of the invention, conveying rollers are provided both before and after the guiding operation and define conveying means. These rollers are provided on both sides of the conveying path and cooperate in pairs. Two shafts are provided which follow one another respectively in the conveying direction of the shipments and are arranged at right angles to the conveying direction with each of the shafts carrying one or more conveying rollers.

Additional objects and advantages of the present invention will become apparent upon consideration of the following description when taken in conjunction with the accompanying drawings in which:

FIGURE 1 is a side elevational view of one embodiment of the present invention.

FIGURE 2 is an end view, partially in section, of the device shown in FIGURE 1.

FIGURE 2a is an end view of another embodiment.

FIGURE 3 is a plan view of the device shown in FIGURES 1 and 2.

With more particular reference to the drawings, FIGURES 1, 2, and 3 illustrate a device having a conveying belt 2 which forms a feed conveying path for feeding shipments 1 and movement thereof is from right to left as viewed in FIGURES 1 and 3. The shipments are then engaged by conveying rollers 3 and 4 which are driven at the same speed. As shown in the drawing, rollers 3 and 4 are disposed one after the other in the conveying direction. Although in these figures of the drawing only one roller is shown on each shaft, in practice, as shown in FIGURE 2a, two conveying rollers disposed in a side-by-side relationship can be used since this will improve the guiding capabilities of the rollers. The same is true for the further conveying rollers which will be described below.

A guide surface 5 is provided as a guiding and turning element. This surface has a generally cylindrical curve in the guiding region thereof and is semicircular in cross section. The axis of curvature is disposed at angle of 45° with respect to the conveying direction of the arriving shipments. This guide surface 5 forms a continuous transition between the above-mentioned feeding conveying path and the exit or discharge conveying path of this device. One suitable feature of the invention which is not absolutely necessary for the operation of this device is the provision of a leading surface 6 disposed within the curvature of the guide surface 5 and disposed substantially concentrically therewith. This leading surface on the one hand extends into the region of the conveying rollers and/or the feed conveying path for better guiding of the shipments, and, on the other hand, projects in a similar manner in the direction of the exit or discharge. The discharge is disposed at right angles to the feed conveying path and in a plane which is parallel thereto. In the illustrated embodiment, the exit is disposed at right angles to the feed and the direction is downwardly.

At the exit portion of guide surface 5 which, like the leading surface 6, extends toward the discharge end, conveying rollers are provided in a similar manner to the rollers disposed at the feeding end. These rollers are arranged in pairs on both sides of the conveying path with the conveying roller pair 7, 7', being disposed directly adjacent the guiding region of the guide surface. Two further shafts are also arranged in pairs and at right angles to the conveying direction of the shipments and carry the conveying roller pairs 8, 8', and 9, 9'. These conveying rollers extend through recesses in the surfaces 5 and 6 so that the rollers may contact the shipments.

A deflection element 10 is provided so that the shipments can be fed without disturbances from the conveying rollers 3 and 4 to the guide surface 5 of the guiding and turning element. The deflection element 10, as shown in solid lines, is disposed between the feed conveying path and the guide surface 5 in such a manner that the shipments must be transported from the feed conveying path into the effective range of the guide surface.

In order to assure that there will be trouble-free passage of the shipments through the guiding and turning element at high speeds, the shipments are guided by at least one of the above-mentioned conveying means during the entire period of time that they are passing through the device. The length of the transit path of the shipments in the guiding and turning element is arranged to be such that the shipment is engaged by the first conveying roller pair 7 of the discharge path while its trailing edge is still within the effective range of the conveying belt 2 and of the second conveying roller 4 of the feed conveying path.

The shipments which enter the guiding and turning element at high speed are guided by the conveying belt 2 and the conveying rollers 3. The deflection element 10 has its end projecting into the conveying path and is curved so that, during passage, the shipments are provided with a preliminary curve, first at their upper front edge and finally along their entire width.

By this means, the small curvature of the guide surface is not immediately effective upon the shipments which arrive from the straight conveying path. In the guiding and turning element, the shipments due to their inherent rigidity and kinetic energy adhere from the inside against the guide surface 5. The purpose of the leading surface 6 which is disposed interiorly of the guide surface 5 is only to aid and provide a continuous curvature to the somewhat stiffer shipments which perhaps do not entirely adhere to the outer guide surface 5. Due to the special curvature of the two surfaces 5 and 6, the shipments are not only turned by 90° from their original direction of movement but are simultaneously turned in their planes by 180° so that, for example, as viewed in FIGURE 1, the surface which is facing up when the shipment is fed into the device will be facing down when it is delivered from the device. The conveying roller pairs 8 and 9 finally deliver the shipments by means of a discharge conveying path, for example, at a stacking device for further processing.

If several guiding and turning devices according to the present invention are to be connected one behind the other to a conveying path, for example, for the purpose of sorting the shipments into various compartments or pigeon holes, then the shipments must not of necessity be deflected by deflection element 10 into the guiding and turning element. For this purpose, the deflection element 10 which is disposed between the conveying path and the guide surface 5, is constructed to be movable by moving means M in the manner of a path switch to permit selective feeding of the shipments into the effective range of the guide surface 5.

As shown in FIGURE 2a, rollers 4a and 4b are provided on a shaft and they cooperate with feeding rollers 4a' and 4b', respectively, rather than with a feed belt.

In a similar manner, a driven drum could be used as a guiding and turning element which may be fashioned as a suction drum or which is in the guiding region encompassed by a guide surface in a concentric and semicircular manner. In such an event, the shipments could also be guided during the guiding and turning operation proper. Due to the special construction of the driven guiding means, the shipments would leave the guiding and turning element also at right angles to their initial feeding direction, but they would, in addition, be provided with a lateral motion component until the guiding operation proper is finished.

It will be understood that the above description of the present invention is susceptible to various modifications, changes, and adaptations, and the same are intended to be comprehended within the meaning and range of equivalents of the appended claims.

What is claimed is:
1. A device for guiding and turning flexible, flat articles, comprising, in combination: a feed conveying path; a discharge conveying path at an angle of substantially 90 degrees to said feed conveying path; guiding and turning means connecting said paths in continuous transition and including a curved guide element for guiding and changing the direction by substantially 90 degrees and changing the conveying plane by substantially 180 degrees of articles while they engage the inside surface of said element due to their inherent rigidity and/or kinetic energy, the portion of the curved surface which provides the guidance having a straight line as its generatrix; and conveying means disposed in front of and behind said surface in said paths for engaging an article during the entire guiding and turning operation.

2. A device as defined in claim 1 comprising a deflection element disposed between the feed conveying path and the guide element for forcing articles to move from the feed conveying path into the effective range of the guide element.

3. A device as defined in claim 1 comprising a deflection element selectively movable into one position wherein it is disposed between the feed conveying path and the guide element for forcing articles to move from the feed conveying path into the effective range of the guide element and another position wherein the deflection element allows articles to remain out of the effective range of the guide element.

4. A device as defined in claim 1 wherein the guide surface is cylindrical and the axis thereof is disposed at substantially a 45° angle with the conveying direction.

5. A device as defined in claim 1 wherein said conveying means includes pairs of conveying rollers arranged on both sides of a conveying path.

6. A device as defined in claim 5 wherein said conveying means includes two shafts which are disposed one after the other in the conveying direction and are arranged at right angles to the conveying direction, at least one of said rollers being disposed on each shaft.

7. A device for guiding and turning flexible, flat articles, comprising, in combination: a feed conveying path; a discharge conveying path at an angle to said feed conveying path and disposed in a plane which is parallel to the plane of the feed conveying path; guiding and turning means connecting said paths in continuous transition and including two slightly spaced and similarly curved guide elements for guiding and changing the direction by substantially 90 degrees and conveying plane by substantially 180 degrees of the articles passing between them while the articles engage the inside surface of the outermost of said elements due to their inherent rigidity and/or kinetic energy, the portions of the curved surfaces which provide the guidance each having a straight line as its generatrix; and conveying means disposed in front of and behind said surfaces in said paths for engaging an article during the entire guiding and turning operation.

References Cited by the Examiner
UNITED STATES PATENTS

| | | | |
|---|---|---|---|
| 2,977,116 | 3/61 | Edminster | 271—88 |
| 3,052,467 | 9/62 | Fertig | 271—71 |
| 3,137,499 | 6/64 | Maidment | 271—71 |

SAMUEL F. COLEMAN, *Primary Examiner.*